United States Patent [19]

Eck et al.

[11] 4,189,415

[45] Feb. 19, 1980

[54] AQUEOUS VINYLCHLORIDE/VINYL ACETATE/ETHYLENE COPOLYMERS AND PROCESS

[75] Inventors: Herbert Eck; Christof Kemenater; Wilhelm Kaiser; Manfred Hannebaum, all of Burghausen, Fed. Rep. of Germany

[73] Assignee: Wacker-Chemie GmbH, Munich, Fed. Rep. of Germany

[21] Appl. No.: 914,623

[22] Filed: Jun. 12, 1978

[30] Foreign Application Priority Data

Aug. 1, 1977 [DE] Fed. Rep. of Germany ....... 2734656

[51] Int. Cl.$^2$ ............................................. C08L 23/00
[52] U.S. Cl. ...................... 260/29.6 WA; 260/29.6 T; 260/29.6 TA
[58] Field of Search ................. 260/29.6 WA, 29.6 T, 260/29.6 TA

[56] References Cited

U.S. PATENT DOCUMENTS

| | | | |
|---|---|---|---|
| 3,358,054 | 12/1967 | Hardt et al. | 260/29.6 WA |
| 3,501,440 | 3/1970 | Kamio et al. | 260/29.6 T |
| 3,632,542 | 1/1972 | Fox et al. | 260/29.6 T |
| 3,639,326 | 2/1972 | Kray et al. | 260/29.6 T |
| 3,660,332 | 5/1972 | Kamio et al. | 260/29.6 T |
| 3,816,363 | 6/1974 | Wicht et al. | 260/29.6 WA |
| 3,830,761 | 8/1974 | Lenney | 260/29.6 T |
| 3,929,706 | 12/1975 | Schmidt et al. | 260/29.6 T |
| 4,035,329 | 7/1977 | Wiest et al. | 260/29.6 WA |

*Primary Examiner*—William E. Schulz
*Attorney, Agent, or Firm*—Hammond & Littell

[57] ABSTRACT

The invention relates to aqueous copolymer dispersions containing high proportions of vinyl chloride units in the copolymer, together with vinyl acetate units and ethylene units, which dispersions contain only polyvinyl alcohol as protective colloid; as well as to their manufacture and to their use.

9 Claims, No Drawings

AQUEOUS VINYLCHLORIDE/VINYL ACETATE/ETHYLENE COPOLYMERS AND PROCESS

BACKGROUND OF THE INVENTION

Aqueous copolymer dispersions that contain vinyl chloride units, vinyl acetate units and ethylene units are known and described in German Published Application (DOS) Nos. 21 19 549 and 22 52 285, corresponding to U.S. Pat. Nos. 3,639,326 and 3,830,761 respectively. To obtain stable dispersions from these monomers, it was hitherto always necessary to take special steps regarding the protective colloid/emulsifier system. Further, it was often absolutely necessary to adhere to critical amounts of ionic or, alternatively, nonionic emulsifiers. Not only did these special colloid stabilization systems comprising emulsifiers, protective colloids and auxiliary monomers have to be reproducibly adhered to under relatively complicated industrial conditions, but sometimes they also had disadvantageous effects in various uses of the dispersions, such as, for example, in adhesives or concrete additives. Adhesives containing emulsifiers or auxiliary stabilizing monomers generally have a relatively low water-resistance. Older applications, such as, for example, DBP (German Patent) 968,141 describe the production of thermostable polymers or copolymers of vinyl chloride. It is, of course, emphasized therein as being specific to the invention that the polymerization may on no account be carried out until the monomers, vinyl chloride and/or vinyl acetate, are substantially consumed.

OBJECTS OF THE INVENTION

An object of the present invention is to produce copolymer dispersions containing a high proportion of vinyl chloride units in the copolymer, together with vinyl acetate units and ethylene units that can be polymerized to form stable dispersions in an economical manner without the use of auxiliary monomers, that is, without monomers having strongly polar groups, such as, for example, carboxyl groups, sulfonic acid groups, carbonamide groups, or emulsifiers.

Another object of the present invention is the development of a stable aqueous vinyl chloride copolymer dispersion having a solids content of from 30% to 70% by weight, said dispersion containing a copolymer consisting of
  50% to 85% by weight of vinyl chloride units
  5% to 35% by weight of vinyl acetate units 5% to 30% by weight of ethylene units, and
  0 to 5% by weight of mono-olefinically unsaturated N-methylolamide units, and, as protective colloid, from 2% to 15% by weight, based on the dispersion weight, of at least one polyvinyl alcohol having a saponification number of between 20 and 240 and a polymerization degree of between 300 and 2000.

A further object of the present invention is the development of a process for the production of the above stable, aqueous vinyl chloride copolymer dispersion comprising the steps of polymerizing monomers in such amounts to give said copolymer in sufficient of an aqueous medium to give a final solids content of from 30% to 70% by weight at temperatures of between +10° C. to +85° C. in the presence of 0.01% to 3% by weight of the monomer charge of a redox catalyst system while stirring, at a constant ethylene pressure of between 20 and 150 bar and in the presence of 2% to 15% by weight of the dispersion of at least one polyvinyl alcohol having a saponification number of between 20 and 240 and a polymerization degree of between 300 and 2000, while maintaining the monomer concentration of the liquid monomers between 5% and 20% by weight by metering in said monomers, and post-polymerizing by the addition of a further 0.005% to 0.1% by weight, based on the monomer charge, of the respective components of the redox catalyst system.

A yet further object of the invention is the development of uses of the above stable, aqueous vinyl chloride copolymer dispersion as (a) binders in hydraulically setting building materials, (b) adhesives in combination with acidic hardeners, and (c) as coating agents in combination with aluminum nitrate, chromium nitrate, acidic phosphates and phosphoric acid as hardeners.

These and other objects of the present invention will become more apparent as the description thereof proceeds.

DESCRIPTION OF THE INVENTION

The subject of the invention is stable, aqueous vinyl chloride copolymer dispersions having solids contents of between 30% and 70% by weight, characterized in that the dispersion contains a copolymer comprising
  50% to 85% by weight of vinyl chloride units,
  5% to 35% by weight of vinyl acetate units, and
  5% to 30% by weight of ethylene units and, as protective colloid, 2% to 15% by weight, based on the dispersion weight, of one or more polyvinyl alcohols having a saponification number of between 20 and 240 and a polymerization degree of between 300 and 2000.

For certain uses of the dispersions, it is advantageous additionally to copolymerize from 0.5% to 5% by weight of units of olefinically-unsaturated N-methylolamides.

More particularly, therefore, the present invention relates to a stable aqueous vinyl chloride copolymer dispersion having a solids content of from 30% to 70% by weight, said dispersion containing a copolymer consisting of
  50% to 85% by weight of vinyl chloride units
  5% to 35% by weight of vinyl acetate units
  5% to 30% by weight of ethylene units, and
  0 to 5% by weight of mono-olefinically unsaturated N-methylolamide units, and, as protective colloid, from 2% to 15% by weight, based on the dispersion weight, of at least one polyvinyl alcohol having a saponification number of between 20 and 240 and a polymerization degree of between 300 and 2000; as well as the process of preparing said copolymer dispersions comprising the steps of polymerizing monomers in such amounts to give said copolymer in sufficient of an aqueous medium to give a final solids content of from 30% to 70% by weight at temperatures of between +10° C. to +85° C. in the presence of 0.01% to 3% by weight of the monomer charge of a redox catalyst system while stirring, at a constant ethylene pressure of between 20 and 150 bar and in the presence of 2% to 15% by weight of the dispersion of at least one polyvinyl alcohol having a saponification number of between 20 and 240 and a polymerization degree of between 300 and 2000, while maintaining the monomer concentration of the liquid monomers between 5% and 20% by weight by metering in said monomers, and post-polymerizing by the addition of a further 0.005% to 0.1% by weight, based on the monomer charge, of the respective components of the redox catalyst system.

The mentioned monomer compositions are limiting ranges. In many cases it may be of advantage to aim at copolymer dispersions with compositions of 60% to 80% by weight of vinyl chloride units, 8% to 20% by weight of vinyl acetate units, 10% to 25% by weight of ethylene units and 0.5% to 5% by weight of units of olefinically-unsaturated N-methylolamides.

Olefinically-unsaturated N-methylolamides which may be employed are, for example, selected from the group consisting of N-methylol-alkenoylamide having 3 to 6 carbon atoms in the alkenoyl, N-methylol alkenyl carbamates having 3 to 6 carbon atoms in the alkenyl, Mannich bases thereof, and N-methylol-lower alkyl ethers thereof, such as N-methylolacrylamide, N-methylolmethacrylamide, N-methylol ally carbamate, Mannich bases, and N-methylol ethers of N-methylolacrylamide, N-methylolmethacrylamide or N-methylol allyl carbamate with methyl or isobutyl alcohols.

The dispersions are produced in heatable and coolable autoclaves fitted with stirrers. For this purpose the necessary quantity of polyvinyl alcohol having a saponification number of between 20 and 240, and having 300 to 2000 monomer units in the polymer molecule, generally 2% to 15% by weight, preferably 2.5% to 12% by weight, calculated on the dispersion, dissolved in water, is placed in the autoclave. A single polyvinyl alcohol may be used alone, but, alternatively, mixtures of different polyvinyl alcohols may be used. The polymerization is generally carried out with quantities of redox catalyst of between 0.01% and 3% by weight, based on the monomers. Generally, the total required quantity of the oxidizing component of the catalyst, or most of it, is introduced at the beginning and the polymerization is controlled by metering in the reducing agent. It is also possible, however, in known manner, to introduce the reducing agent at the beginning and control the reaction with the oxidizing agent. Finally, the polymerization may be controlled by the simultaneous metering in of both components. Approximately 0.01% to 0.5%, preferably 0.03% to 0.3%, of reducing agent and 0.01% to 2%, preferably 0.03% to 0.8%, of oxidizing agents are required, all by weight based on the monomers, wherein, depending on the process, the ratio of oxidizing agent to reducing agent is 0.15 to 6. Examples of the oxidizing component of the catalyst are ammonium persulfate, potassium persulfate, hydrogen peroxide and t-butyl hydroperoxide. Examples of the reducing component are sodium sulfite, sodium metabisulfite, and zinc or sodium formaldehydesulfoxylate. Also suitable are $H_2$/noble metal salt catalysts with the simultaneous use of amounts of heavy metal salts as activators. Suitable redox catalyst systems are described, inter alia, in "Fundamental Principles of Polymerization", G. G. D'Alelio, John Wiley & Sons Inc., New York 1952, pages 333 ff.

Before polymerization begins, 10% to 40% by weight of the total quantity of vinyl chloride and vinyl acetate are usually metered into the polyvinyl alcohol solution and the polymerization mixture is saturated with ethylene. During the course of polymerization, the polymerization mixture is stirred. All of the polyvinyl alcohol or only part of it, for example half, can be introduced at the beginning. The monomer concentration of the liquid monomers should not fall below 5% by weight and should not exceed 20% by weight during metering in of the monomers.

The ethylene pressure applied is kept constant and varies between 20 and 150 bar depending on the amount of ethylene that is to be incorporated. The pressure range preferably used is 35 to 100 bar. The necessary pressure is strongly dependent on the viscosity and the stirring effect in the polymerization mixture. The lower the viscosity, the better is the circulation of the substance in the autoclave, and the lower is the ethylene pressure required to incorporate the desired quantity of ethylene into the copolymer, obviously taking into account the copolymerization and solubility parameters.

The polymerization temperature is 10° C. to 85° C., preferably 20° C. to 50° C. During the course of the reaction, the remaining vinyl chloride and vinyl acetate, as well as the 0.5% to 5% by weight of the olefinically-unsaturated N-methylolamides, of which the methylol group may be etherified, are added to the reaction vessel, the ethylene pressure being maintained constant.

The duration of the reaction depends, for example, on the removal of heat, that is to say, the stirring and cooling system, and the desired monomer concentration during polymerization as well as the catalyst system. Generally, polymerization is complete when no further noticeable heat development is ascertainable and when the vinyl acetate monomer concentration has dropped preferably below 1.5%.

After 10 to 20 hours, the polymerization is generally complete. Subsequently, the reaction mixture is post-polymerized, by the addition of additional catalyst and by heating, until the vinyl acetate content is less than 0.5%. For this purpose, generally, quantities of catalyst of 0.005% to 0.1%, preferably 0.01% to 0.04%, by weight, calculated on the dispersion, of the oxidizing agent and of the reducing agent, are necessary.

The dispersions according to the invention are very versatile. They exhibit pigment stability and are excellently suitable as binders in disperse dyestuffs. Their relatively good flame resistance, their high binding capacity and their high saponification resistance render possible the use of the dispersions as binders in hydraulically setting building materials. In addition, they exhibit high adhesive strength and waterproof properties when used in adhesives. In combination with trivalent acidically-hydrolyzing metal salts, favorable pot lives and waterproof properties are obtained. The same applies also in combination with strong protonic acids, such as, for example, phosphoric acid, sulfuric acid, sulfonic acids and hydrochloric acid. The hardener additives are, in the case of salts, added to the dispersion in the form of their concentrated aqueous solution (20% to 70% strength) and, in the case of protonic acids (10% to 50% strength), in quantities of 2% to 10% by volume.

The invention, therefore, also resides in the improvement in the process of forming adhesive bonds which comprises applying a vinyl chloride copolymer dispersion in combination with an acidic hardener selected from the group consisting of trivalent acidically-hydrolyzing metal salts and strong protonic acids to the solid surfaces to be bonded and maintaining said solid surfaces together for a time sufficient to form an adhesive bond, the improvement consisting of using the stable, aqueous vinyl chloride dispersion described above, as said vinyl chloride copolymer dispersion.

The properties of the dispersions when used in gluing wood together, with the addition of trivalent metal inorganic salts, such as, for example, chromium nitrate or aluminum nitrate, were tested according to DIN 68603. According to the highest stress classes of this standard, the adhesive strength is judged after relatively long storage in cold water and/or relatively long storage in boiling water (storage sequence No. 9 of the standard=B4/9). A further important value which characterizes the use properties of dispersion adhesives in combination with inorganic salts is the pot life. This should, for use in certain adhesive applications, be longer than one week. These conditions are in some cases even considerably exceeded by the adhesives used in combination with hardener additives.

When using the dispersion according to the invention as a binder in hydraulically setting building materials and in coating agents, it is customary to admix emulsifiers in quantities of 0.05% to 1.5% by weight of the dispersions. Suitable nonionic emulsifiers are, inter alia, aliphatic ethers of polyoxyethylene, such as, for example, polyoxyethylene-lauryl ether, and polyoxyethylene-oleyl ether, as well as polyoxyethylene-alkaryl ether, such as polyoxyethylene-octylphenyl ether, polyoxyethylene-nonylphenyl ether, etc. Also suitable are polyoxyethylene glycol esters and amides, such as, for example, esters with higher fatty acids such as the laurate, oleate and isononate and N-polyoxyethylene lauramide. Block polymers of ethylene oxide and propylene oxide may also be co-used. Also it is frequently advantageous to co-use anti-foaming agents in quantities of 0.05% to 0.3% by weight of the active substance.

The present invention, therefore, also resides in the improvement in the process of forming bonds comprising allowing a mixture of hydraulically-setting binders and vinyl chloride copolymer dispersions to harden, the improvement consisting of using the stable, aqueous vinyl chloride dispersion described above as said vinyl chloride dispersion.

When using the dispersions as coating agents, as in the case of adhesives, acidic trivalent metal salts or, alternatively, strong protonic acids are added. This results in a water-resistant coating. Examples of such acidic salts are trivalent metal salts selected from the main and subsidiary group of the Periodic Table of the elements, with strong protonic acids. Preferred hardeners in this connection are acidic phosphates, phosphoric acid, aluminum nitrate and chrominum (III) nitrate. These coating agents consisting of dispersion and hardener have favorable pot lives and have a corrosion-inhibiting action on, for example, iron, combined with excellent adhesion. In this case, too, the hardeners are, in the case of salts, added in the form of their concentrated aqueous solution or, in the case of protonic acids, in semi-concentrated form in quantities of 2% to 8% by weight.

An inorganic setting material, such as hydraulic cement, Portland cement, natural cement (Roman cement) or aluminous cement is used as a mortar binder. Customary cement additives, such as gypsum, gypsum mortar, calcium phosphate, lime or other such calcium-containing binders, magnesium oxychloride, magnesite or other magnesium-containing or oxy-salt compositions or other similar setting inorganic substances, as used as binders for unmodified concrete and mortar compositions, may optionally be added.

Sand, stones, concrete, ballast, pebbles, granite, carborundum, aluminum oxide, emery, marble chips, sawdust, slag, asbestos, mica, talcum, flint stones or synthetic products, such as, for example, pulverized ceramic materials, may be added as customary aggregates.

When using the dispersions in coating agents, for example, blocked polyisocyanates, water-condensable ureaformaldehyde resins or heat-hardenable melamine-formaldehyde resins can be added to the latex coating compositions. Pigments, such as, for example, clays, aluminum silicates, calcium carbonate, magnesium carbonate, mica, talcum, diatomaceous earth or titanium oxide, zinc phosphate, zinc chromates, iron oxide and chromium oxide, may likewise be added. In this case alkaline and carbonate-containing products may obviously only be added if no acidic hardeners are added. Many other processing auxiliaries known to the expert, such as thickeners, coalescence auxiliaries, fillers and reinforcing agents, plasticizers, levelling agents and diluents, antioxidants and stabilizers, or fungicides, may also be co-used. The coating agents are suitable as protective or decorative coverings for, for example, metal, wood or mineral surfaces.

Even when using the dispersions in waterproof adhesives, fillers are occasionally added. Gypsum, barite and other mineral substances that do not have an alkaline reaction and do not contain any carbonate groups, may be mentioned. In certain cases protective colloids, especially polyvinyl alcohol, are subsequently added. Further possible additives are preservatives, dyestuffs, plasticizers, filling auxiliaries and thickeners. Suitable plasticizers are, for example, butoxyethoxyethyl acetate, acetyl ricinoleic acid butyl ester, diesters of oxalic acid, succinic acid, adipic acid, phthalic acid with aliphatic, branched or unbranched alkanols having 2 to 16 carbon atoms, such as, for example, oxalic acid dibutyl ester, succinic acid dibutyl ester, diisobutyl phthalate, dioctyl phthalate, diisotridecyl phthalate, as well as alkylene glycols, such as, for example, ethylene glycol, hexamethylene glycol, also benzyl alcohol and ester/alcohol mixtures, and diphenoxyphenylformal. Organic solvents which are aromatic hydrocarbons or aliphatic hydrocarbons may also be added.

The following examples are illustrative of the invention without being limitative in any respect.

EXAMPLE 1

400 gm of polyvinyl alcohol having a saponification number of 60 and a Höppler viscosity of 13 m.Pa.s. (of a 4% aqueous solution at 20° C.) were dissolved, together with 40 gm of potassium persulfate, in 5.4 liters of water. A mixture of 4.2 kg of vinyl chloride and 0.8 kg of vinyl acetate were continuously metered in, while stirring at a polymerization temperature of 30° C. During the whole of the polymerization period, the ethylene pressure is held constant at 50 bar. The polymerization was started by the addition of a 1% strength sodium formaldehydesulfoxylate solution and controlled by the further addition of reducing agent. Altogether the consumption of reducing agent of the said concentration was 770 gm (7.7 gm of reducing agent, 100% strength). After 15 hours, polymerization was complete. In the post-polymerization phase, the following were added:

| | | |
|---|---|---|
| 2.67 gm | of Rongalite ®C, | dissolved in 15 ml of water (= 0.02% based on the dispersion) |
| 2.67 gm | of t-butyl hydroperoxide | (= 0.02% based |

The dispersion obtained had a solids content of 51.8% by weight, a viscosity, measured in the Epprecht Rheometer stage C III, of 5900 m.Pa.s. and a minimum film-forming temperature of 20° C. The dispersion had a polymeric composition of 16.7% ethylene, 70% vinyl chloride, and 13.3% vinyl acetate. The dispersion is freeze-resistant, pigment-stable and shear-stable and has good strength values. After the addition of 2% by weight of butoxyethoxyethyl acetate to the dispersion, the tear strength of the film was approximately 12.5 N/mm$^2$ with an elongation-at-break of approximately 350%. The examination of wood pasted together with a mixture of the dispersion with 5% by weight of a 40% strength aqueous solution of chromium (III) nitrate, produced from 70 parts by weight of the hydrated (9H$_2$O) salt in 30 parts by weight of water, yielded, according to DIN 68603, the following adhesive strengths:

| | |
|---|---|
| Lgf. No. 5 | 2.7 N/mm$^2$ |
| Lgf. No. 9 | 4.0 N/mm$^2$ |

*(Lgf = "Lagerungsfolge" or storage sequence of DIN 68603)

When using the dispersion as concrete additive with the co-use of a customary anti-foaming agent in a quantity of 0.1% by weight, calculated on the dispersion, the values shown in Table 3 are obtained. The anti-foaming agent consists of 94% by weight of dimethylpolysiloxane having a viscosity of more than 20 centistokes at 25° C., and 6% by weight of finely divided silica. With a plastics/cement factor of 0.05 and a water/cement factor of 0.48, the following values were ascertained:

TABLE 1

| | 28 d Normal climate | 28 d Under water | 7 d Under water and 21 d normal climate | 7 d Normal climate and 21 d under water |
|---|---|---|---|---|
| Bending tensile strength N/mm$^2$ | 9.7 | 9.2 | 9.0 | 6.5 |
| Pressure resistance N/mm$^2$ | 46.5 | 48.0 | 57.8 | 36.0 |

EXAMPLE 2

275 gm each of polyvinyl alcohols having a saponification number of about 70 and viscosities of 13 and 6 mPa.s, respectively, were dissolved, together with the catalyst, in water as in Example 1. The processing conditions are the same as in Example 1 except that at the same time as the vinyl chloride/vinyl acetate was metered in, a solution of 50 gm of N-methylol-acrylamide in 100 cm$^3$ of water/methanol (1:1) was added.

A dispersion with a solids content of 51.7% by weight, a viscosity (Rheometer stage C III) of 4930 m Pa.s and a minimum film-forming temperature of 15° C. was obtained. It is freeze-resistant, pigment-stable and shear-stable and has good resistance values. The test, according to DIN 68603, as an adhesive with the addition of chromium (III) nitrate (the quantity given in Example 1) gave the following results:

| | |
|---|---|
| Lgf. No. 9 | 4.1 N/mm$^2$ |

EXAMPLE 3

The processing conditions are the same as in Example 2 except that double the amount of N-methylolacrylamide and 440 gm of a mixture of polyvinyl alcohols having a saponification number of 140 were used. 140 gm of polyvinyl alcohol having a Höppler viscosity of 13 m.Pa.s. and 300 gm having a Höppler viscosity of 5 m.Pa.s. were used.

The dispersion so produced was freeze-resistant, pigment-stable and shear-stable, had a solids content of 53.2% by weight and a viscosity measured in the Epprecht Rheometer (stage C III) of 11700 m.Pa.s.

The following values were obtained in the test of the adhesive strength according to DIN 68603. With the addition of chromium nitrate (5% by weight of the dispersion of a 70% aqueous solution)

| | |
|---|---|
| Lgf. No. 5 | 4.8 N/mm$^2$ |
| Lgf. No. 9 | 4.9 N/mm$^2$ |

Aluminum nitrate (5% by volume of a 70% aqueous solution.

| | | |
|---|---|---|
| Concentration data: | 70% strength calculated on the hydrated salt with 9 molecules of water of crystallization.) | |
| | Lgf. No. 5 | 3.6 N/mm$^2$ |
| | Lgf. No. 9 | 4.0 N/mm$^2$ |

EXAMPLE 4

The method of operation was the same as in Example 3 except that polyvinyl alcohols having a saponification number of 20 were used. The Hoppler viscosities of the polyvinyl alcohols used were 13 and 5 m.Pa.s. respectively.

The results of the adhesive strength test according to DIN 68603 using chromium (III) nitrate (in the amount given in Example 1) were as follows:

| | |
|---|---|
| Lgf. No. 5 | 4.4 N/mm$^2$ |
| Lgf. No. 9 | 5.4 N/mm$^2$ |

EXAMPLE 5

440 gm of a polyvinyl alcohol having a saponification number of 140 and a Höppler viscosity of 5 m.Pa.s. were dissolved, together with 40 gm of potassium persulfate, in water and heated to approximately 37° C. A mixture of 4.2 kg of vinyl chloride and 0.8 kg of vinyl acetate were continuously metered in over a period of 5 hours. During this time the ethylene pressure was maintained at 50 bar and 175 gm of N-methylol-acrylamide in aqueous methanolic solution were metered in.

The reaction was controlled by the addition of sodium formaldehydesulfoxylate. After 14 hours, the polymerization was complete, the product was adjusted to a pH of 7 with ammonia, the pressure was released, and post-polymerization and degassing were carried out.

The dispersion obtained had a solids content of 52.5, a polymeric composition of 16.2% ethylene, 68% vinyl chloride, 13% vinyl acetate and 2.8% N-methylolacrylamide, a viscosity (Rheometer C III) of 2500 m.Pa.s. and a minimum film-forming temperature of 20° C. It was shear-stable, pigment-stable and freeze-resistant and, in the non-cross-linked state, had a tear strength of 18 N/mm$^2$ with an elongation-at-break of approximately 290%.

The results of a test according to DIN 68603 using chromium nitrate were:

|  | Lgf. No. 5 | 6.2 N/mm$^2$ |
|---|---|---|
|  | Lgf. No. 9 | 6.2 N/mm$^2$ |
| Aluminum nitrate: | Lgf. No. 9 | 4.8 N/mm$^2$ |

A subsequent addition of 1% polyvinyl alcohol to the dispersion did not substantially alter these values.

| Chromium nitrate: | Lgf. No. 5 | 5.8 N/mm$^2$ |
|---|---|---|
|  | Lgf. No. 9 | 6.1 N/mm$^2$ |
| Aluminum nitrate: | Lgf. No. 9 | 4.9 N/mm$^2$ |

The pot life was more than 20 days.

| 5% of 25% strength aqueous phosphoric acid: | Lgf. No. 9 | 4.5 N/mm$^2$ |
|---|---|---|
|  | pot life: | more than 14 days |
| 5% of 25% strength aqueous sulfuric acid: | Lgf. No. 9 | 4.0 N/mm$^2$ |
|  | pot life: | more than 14 days |

EXAMPLE 6

The polymerization was carried out in an analogous manner to that used in Example 3, except that a polyvinyl alcohol having a saponification number of 200 was used.

The solids content of the dispersion was 52.9%, the viscosity (Rheometer C III) 7300 m.Pa.s., and the minimum film-forming temperature 25° C. The pigment-stable and shear-stable dispersion had a K-value of 63.

The results of the test according to DIN 68603, with the addition of chromium nitrate (in the amount given in Example 1), were as follows:

|  | Lgf. No. 5 | 5.6 N/mm$^2$ |
|---|---|---|
|  | Lgf. No. 9 | 6.4 N/mm$^2$ |
| Aluminum nitrate: (amount as in Example 3) | Lgf. No. 5 | 4.6 N/mm$^2$ |
|  | Lgf. No. 9 | 5.0 N/mm$^2$ |

EXAMPLE 7

Compared with Example 5, the following changes were made:
(1) Reaction temperature: 30° C.
(2) N-methylolacrylamide: 210 gm The solids content of the dispersion was 54.1, the viscosity (Rheometer C III) 4750 m.Pa.s. and the minimum film-forming temperature 18° C. The dispersion was freeze-resistant, pigment-stable and shear-stable.

The results of the test according to DIN 68603 were as follows:

| Chromium nitrate | Lgf. No. 5 | 6.2 N/mm$^2$ |
|---|---|---|
|  | Lgf. No. 9 | 6.0 N/mm$^2$ |
| Aluminum nitrate | Lgf. No. 5 | 5.4 N/mm$^2$ |
|  | Lgf. No. 9 | 4.5 N/mm$^2$ |

EXAMPLE 8

Compared with Example 5, the following changes were made:
(1) Reaction temperature: 40°–45° C.
(2) N-methylolacrylamide: 230 gm (4%).

The solids content was 53.1%, the viscosity (Rheometer C III) 2800 m.Pa.s., and the minimum film-forming temperature 14° C. The dispersion was freeze-resistant, pigment-stable and shear-stable.

The results of the test according to DIN 68603 using chromium nitrate were as follows:

| Lgf. No. 5 | 5.6 N/mm$^2$ |
|---|---|
| Lgf. No. 9 | 5.6 N/mm$^2$. |

The pot life was 25 days.

EXAMPLE 9/10

The replacement of N-methylolacrylamide in Example 8 by the corresponding methoxy or isobutoxy ether made no significant changes in the properties of the dispersion.

EXAMPLE 11

Compared with Example 5, the following changes were made:
(1) Reaction temperature: 40° C.
(2) N-methylolacrylamide: 420 gm The solids content of the dispersion was 53.9% the viscosity (Rheometer C III) 3400 m.Pa.s., and the minimum film-forming temperature 16° C.

The results of the test according to DIN 68603, with the addition of aluminum nitrate, were as follows:

| Lgf. No. 5 | 5.1 N/mm$^2$ |
|---|---|
| Lgf. No. 9 | 4.9 N/mm$^2$ |

EXAMPLE 12

The polymerization was carried out in a manner analogous to that used in Example 5, except that, instead of 175 gm of N-methylolacrylamide, 175 gm of N-methylolallyl carbamate were co-polymerized.

The product had a solids content of 51.4%, a viscosity (Rheometer C III) of 2100 m.Pa.s., and a minimum film-forming temperature of 19° C. The dispersion was freeze-resistant, pigment-stable and shear-stable.

The results of the test according to DIN 68603, with the addition of chromium nitrate, were as follows:

|  | Lgf. No. 5 | 6.0 N/mm$^2$ |
|---|---|---|
|  | Lgf. No. 9 | 5.7 N/mm$^2$ |
| Aluminum nitrate: | Lgf. No. 5 | 5.2 N/mm$^2$ |
|  | Lgf. No. 9 | 4.5 N/mm$^2$ |

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A stable aqueous vinyl chloride copolymer dispersion having a solids content of from 30% to 70% by weight, said dispersion containing a copolymer consisting of
   - 50% to 85% by weight of vinyl chloride units
   - 5% to 35% by weight of vinyl acetate units
   - 5% to 30% by weight of ethylene units, and
   - 0 to 5% by weight of mono-olefinically unsaturated N-methylolamide units, and, as sole protective colloid, from 2% to 15% by weight, based on the dispersion weight, of at least one polyvinyl alcohol having a saponification number of between 20 and 240 and a polymerization degree of between 300 and 2000.

2. The stable, aqueous vinyl chloride copolymer dispersion of claim 1 wherein said copolymer had
   - 60% to 80% by weight of vinyl chloride units,
   - 8% to 20% by weight of vinyl acetate units,
   - 10% to 25% by weight of ethylene units, and
   - 0.5% to 5% by weight of olefinically-unsaturated N-methylolamide units.

3. The stable, aqueous vinyl chloride copolymer dispersion of claim 1 wherein said at least one polyvinyl alcohol was present in an amount of from 2.5% to 12% by weight of the dispersion.

4. The stable, aqueous vinyl chloride copolymer dispersion of claim 1 wherein said at least one polyvinyl alcohol consisted of at least two polyvinyl alcohols having different molecular weights.

5. The stable, aqueous vinyl chloride copolymer dispersion of claim 1 wherein said N-methylolamide is selected from the group consisting of N-methylolalkenoylamide having 3 to 6 carbon atoms in the alkenoyl, N-methylol alkenyl carbamates having 3 to 6 carbon atoms in the alkenyl, Mannich bases thereof, and N-methylol-lower alkyl ethers thereof.

6. The process for the production of the stable, aqueous vinyl chloride copolymer of claim 1 consisting essentially of the steps of polymerizing monomers in such amounts to give said copolymer in sufficient of an aqueous medium to give a final solids content of from 30% to 70% by weight at temperatures of between $+10°$ C. to $+85°$ C. in the presence of 0.01% to 3% by weight of the monomer charge of a redox catalyst system while stirring, at a constant ethylene pressure of between 20 and 150 bar and in the presence of 2% to 15% by weight of the dispersion of at least one polyvinyl alcohol having a saponification number of between 20 and 240 and a polymerization degree of between 300 and 2000, while maintaining the monomer concentration of the liquid monomers between 5% and 20% by weight by metering in said monomers, and post-polymerizing by the addition of a further 0.005% to 0.1% by weight, based on the monomer charge, of the respective components of the redox catalyst system.

7. In the process of forming bonds comprising allowing a mixture of hydraulically-setting binders and vinyl chloride copolymer dispersions to harden, the improvement consisting of using the stable, aqueous vinyl chloride dispersion of claim 1, as said vinyl chloride copolymer dispersion.

8. In the process of forming adhesive bonds which comprises applying a vinyl chloride copolymer dispersion in combination with an acidic hardener selected from the group consisting of trivalent acidically-hydrolyzing metal salts and strong protonic acids to the solid surfaces to be bonded and maintaining said solid surfaces together for a time sufficient to form an adhesive bond, the improvement consisting of using the stable, aqueous vinyl chloride dispersion of claim 1, as said vinyl chloride copolymer dispersion.

9. An adhesive composition comprising said vinyl chloride copolymer dispersion of claim 1 and from 2% to 10% by volume of an acidic hardener selected from the group consisting of trivalent acidically-hydrolyzing metal salts and strong protonic acids.